United States Patent
Chandrasekaran et al.

(10) Patent No.: US 11,198,924 B2
(45) Date of Patent: Dec. 14, 2021

(54) COMPOSITE MATERIALS

(75) Inventors: Lakshman Chandrasekaran, Farnborough (GB); Andrew David Foreman, Farnborough (GB)

(73) Assignee: QinetiQ Limited

(*) Notice: Subject to any disclaimer, the term of this patent is extended or adjusted under 35 U.S.C. 154(b) by 2369 days.

(21) Appl. No.: 11/663,938

(22) PCT Filed: Oct. 20, 2005

(86) PCT No.: PCT/GB2005/004043
§ 371 (c)(1),
(2), (4) Date: Mar. 27, 2007

(87) PCT Pub. No.: WO2006/046008
PCT Pub. Date: May 4, 2006

(65) Prior Publication Data
US 2007/0202296 A1   Aug. 30, 2007

(30) Foreign Application Priority Data
Oct. 28, 2004 (GB) .................... 0423948.9

(51) Int. Cl.
| | |
|---|---|
| B32B 3/04 | (2006.01) |
| C22C 14/00 | (2006.01) |
| B32B 5/28 | (2006.01) |
| C22C 19/03 | (2006.01) |
| B29C 70/22 | (2006.01) |
| C08J 5/04 | (2006.01) |
| D03D 15/00 | (2021.01) |

(Continued)

(52) U.S. Cl.
CPC .............. *C22C 14/00* (2013.01); *B29C 70/22* (2013.01); *B32B 5/28* (2013.01); *C08J 5/041* (2013.01);

(Continued)

(58) Field of Classification Search
CPC ........... B32B 3/04; B32B 27/04; B32B 27/12; B32B 5/02; B32B 15/08; B32B 15/01; C22C 19/03

(Continued)

(56) References Cited

U.S. PATENT DOCUMENTS

| | | |
|---|---|---|
| 5,173,359 A | 12/1992 | Toyoshima et al. |
| 5,396,932 A * | 3/1995 | Homma .................. D03D 15/00 139/420 A |

(Continued)

FOREIGN PATENT DOCUMENTS

| | | |
|---|---|---|
| DE | 199 31 383 | 11/2008 |
| EP | 1420094 | 5/2004 |

(Continued)

OTHER PUBLICATIONS

Translation of Japanese Office Action for Japanese Patent Application No. JP2007-538494 dated Sep. 10, 2012, 2 pages.

*Primary Examiner* — Jennifer A Boyd
(74) *Attorney, Agent, or Firm* — McDonnell Boehnen Hulbert & Berghoff LLP

(57) ABSTRACT

A fibre reinforced polymer (FRP) composite structure incorporates a woven preform containing tows of carbon or other advanced fibres and wires of shape memory alloy (SMA). The SMA wires are capable of absorbing much larger amounts of strain energy than the conventional components of FRP composites and hence enhance the impact resistance of the structure. The woven form incorporates the SMA into the structure in an optimum manner in terms of handling and performance.

24 Claims, 2 Drawing Sheets

(51) Int. Cl.
  *D03D 1/00* (2006.01)
  *D03D 15/02* (2006.01)
(52) U.S. Cl.
  CPC ............... *C22C 19/03* (2013.01); *D03D 1/00* (2013.01); *D03D 15/00* (2013.01); *D03D 15/02* (2013.01); *B29K 2995/0089* (2013.01); *B29K 2995/0091* (2013.01); *D10B 2101/06* (2013.01); *D10B 2101/12* (2013.01); *D10B 2101/20* (2013.01); *D10B 2321/021* (2013.01); *D10B 2331/021* (2013.01); *D10B 2505/02* (2013.01); *Y10T 428/24215* (2015.01)
(58) Field of Classification Search
  USPC .... 428/301.1, 323, 105, 113, 408, 413, 902, 428/911; 473/371; 524/440, 495, 494; 148/563, 402
  See application file for complete search history.

(56) References Cited

U.S. PATENT DOCUMENTS

| | | | | |
|---|---|---|---|---|
| 5,614,305 A | * | 3/1997 | Paine | B32B 5/12 427/412.1 |
| 6,852,261 B2 | * | 2/2005 | Benjamin | 264/248 |
| 2003/0181261 A1 | * | 9/2003 | Morgan et al. | 473/371 |
| 2004/0025985 A1 | * | 2/2004 | van Schoor et al. | 148/563 |
| 2004/0086706 A1 | * | 5/2004 | Schneider | 428/323 |
| 2004/0143317 A1 | * | 7/2004 | Stinson et al. | 623/1.15 |
| 2004/0176516 A1 | * | 9/2004 | Xu et al. | 524/440 |
| 2004/0242096 A1 | * | 12/2004 | Prakash | 442/19 |

FOREIGN PATENT DOCUMENTS

| | | | |
|---|---|---|---|
| FR | 258889 | | 4/1987 |
| JP | 60 059036 | | 8/1985 |
| JP | 01136185 | U | 9/1989 |
| JP | 04037287 | U | 3/1992 |
| JP | 04-312470 | | 11/1992 |
| JP | 04 312470 | | 3/1993 |
| JP | 05125632 | A | 5/1993 |
| JP | 06-212018 | | 8/1994 |
| JP | 08209488 | | 8/1996 |
| JP | 09 310244 | | 12/1997 |
| JP | 11286849 | | 10/1999 |
| JP | 2003278051 | | 10/2003 |
| JP | 2003335876 | A * | 11/2003 |
| WO | WO 88/09836 | | 12/1988 |
| WO | WO 04/041951 | | 5/2004 |

\* cited by examiner

COMPOSITE MATERIALS

BACKGROUND OF THE INVENTION

(1) Field of the Invention

The present invention relates to composite materials and more particularly to fibre reinforced polymer (FRP) composites.

(2) Description of the Art

FRP composites as a class of material are well known, and comprise a relatively low modulus polymer matrix phase within which is embedded a relatively high modulus fibrous phase, the fibres typically being of carbon, glass or aramid. Such composites can be formulated to exhibit a high strength to weight ratio and can be moulded to form load-bearing structures of complex curvature, meaning that they are of particular utility in many aerospace applications. Conventional FRP composites do, however, have relatively poor resistance to impact damage, which in the case of an aircraft structure could be imparted in use e.g. by runway debris or bird strikes, dropped tools in the course of maintenance procedures, or similar collisions. This is due to the lack of plastic deformation mechanisms for absorbing impact energy in such materials. That is to say such materials undergo very little or no plastic deformation during impact events because of the low strain to failure characteristics of the fibre and the brittleness of the (typically epoxy) matrix. Instead the impact energy is absorbed through various fracture processes, such as matrix cracking, delamination and fibre breakage. This fact means in particular that critical FRP composite structures which are liable to encounter impact risks in service must be subject to stringent and expensive inspection and repair regimes and/or incorporate more material than is required for their principal load-bearing role in an effort to mitigate the problem of impact damage, thereby adding to the weight and cost of the structure.

In order to enhance the impact resistance of FRP composite structures it has been proposed to incorporate a proportion of shape memory alloy (SMA) fibres (or wires—which term will be used for preference herein) distributed within the material. For example U.S. Pat. No. 5,614,305 proposes the incorporation of SMA wires which exhibit a stress-induced martensitic transformation for this purpose, and more particularly wires of superelastic titanium-nickel (nitinol) alloy. It is known that such alloys are capable of absorbing much larger amounts of strain energy, in recoverable fashion, than the components of conventional FRP composites and hence have the potential to increase the impact resistance of composites in which they are incorporated. To the best of the applicant's knowledge, however, SMA-reinforced FRP composite structures have not heretofore been produced on a commercial scale. For example U.S. Pat. No. 5,614,305 describes the lay up of test specimens with one or more discrete layers of SMA wires positioned between plys of conventional reinforcing fibres or with such wires intermingled with conventional fibres in a ply, but does not address how this can be achieved in a time and cost effective manner.

SUMMARY OF THE INVENTION

The present invention therefore seeks to provide for fibre reinforced polymer composite structures of enhanced impact resistance by incorporating SMA wires in a manner which is more amenable to commercial production than is known from the prior art.

In one aspect the invention accordingly resides in a composite structure comprising a polymer matrix with reinforcing fibres and shape memory alloy (SMA) wires embedded therein, the SMA wires being of a composition and in a proportion to substantially enhance the impact resistance of the structure at a predetermined operating temperature or range thereof, and wherein the SMA wires are woven together with at least some of the reinforcing fibres in one or more integral preforms.

By incorporating the SMA wires in an integrated woven preform together with the usual fibrous reinforcement in a structure according to the invention several advantages may accrue.

Firstly the cost to manufacture the preform should not be any more than that for a traditional woven carbon (or the like) fabric as typically used in FRP composites, since the SMA wires can be incorporated with the fibrous tows in the same weaving process. Furthermore the overall manufacturing process for the structure is simplified in comparison with a prior art example involving the placement of discrete SMA wires in the composite because the SMA is already integrated with the fibrous reinforcement and fewer layers and resin films are required, thereby saving considerable time and cost. The thickness of the composite can also be reduced in comparison with an example comprising a discrete SMA layer and a woven fibrous preform since one of the layers (and any necessary matrix interlayer) is effectively eliminated, and this may be particularly advantageous for the production of thin load-bearing skins for aerodynamic surfaces.

The use of the woven SMA/fibrous preform is also of advantage in terms of handleability. Separate SMA wire meshes are difficult to handle because the wires tend to slip over one another and this distorts the mesh shape. In order to stop this happening it has been found necessary to tack them onto a resin film or pre-preg ply in order to allow them to be moved. This problem is completely eliminated when an integrated woven fabric is used, which is as easy to handle as those unreinforced with SMA.

The drapeability of the preform may be expected to be affected by the incorporation of the SMA wires. However, integrating the SMA into the weave structure so that it has the same geometry as the fibrous reinforcement limits this problem to a great extent. In comparison, placing discrete SMA meshes at the interface of composite plys would seriously affect drapeability.

The incorporation of SMA wires into an FRP composite may also be expected to have a negative effect on static mechanical properties and fatigue performance because they are likely to act as stress concentrators. However, integrating these wires into the woven preform reduces this effect as they are able to nest with the fibrous reinforcement and improve load transfer with the same, in a manner which would not be achieved by the use of a discrete SMA mesh.

The wire material in a structure according to the invention may be of any type which offers the stress-strain characteristics of a shape memory alloy system. More particularly such alloys may be formulated such that the capacity of the wires to absorb strain energy at the operating temperature or range of the respective structure may be due to either of the known hysteretic responses of martensitic twinning (shape memory effect) or martensitic transformation (superelasticity) or indeed a combination of the two. The currently preferred alloy is of the Ti—Ni type (nitinol) although other candidates may include ternary Ti—Ni—Cu, Tl—Ni—Nb or Ti—Ni—Hf, copper-based SMAs such as Cu—Zn—Al, Cu—Al—Ni, Cu—Al—Zn—Mn, Cu—Al—Ni—Mn or Cu—Al—Mn—Ni or iron-based SMAs such as Fe—Mn—Si, Fe—Cr—Ni—Mn—Si—Co, Fe—Ni—Mn, Fe—Ni—C or Fe—Ni—Co—Ti. The volume fraction of the SMA wires in the structure may typically be in the range 2-25%, or more particularly 3-12%.

In a variant of the invention, the SMA wires are not of circular cross-section but have an elliptical, oval, or otherwise "flattened" cross-section which is substantially longer in a first dimension than in a second dimension perpendicular to the first, and they are woven into the respective preform with the longer dimension generally parallel to the plane of the preform. Compared to circular wires of the same cross-sectional area this may achieve a reduction in the overall thickness of the preform. In addition, the greater surface area compared to a circular wire may improve the bonding of the SMA into the matrix. Similarly, for a given thickness a single flat wire may have the same volume of SMA as a combination of two or more circular wires, but should be tougher due to the greater homogeneous volume. There may also be cost advantages as, per unit volume of SMA material, the single wire should be cheaper to produce.

The fibrous reinforcement in a structure according to the invention may be of any of the usual (non-SMA) types employed in FRP composites but is preferably one of the group of advanced fibres (typically having a tensile modulus in excess of 50 GPa or more preferably in excess of 200 GPa) including carbon (including graphite), glass, aramid (e.g. Kevlar®), high modulus polyethylene or boron fibres.

The matrix material in a structure according to the invention may also be of any of the usual types employed in FRP composites, including both thermosetting and thermoplastic resins, although thermosets are currently preferred due to their lower processing temperatures which imply fewer constraints on the transformation temperature of the SMA which is incorporated. Conventional FRP composite fabrication methods can be employed with the SMA/fibrous preform, and multiply embodiments may be produced with one or more woven plys of SMA/fibre together with one or more woven plys of the fibre alone.

The SMA wires in a structure according to the invention will normally function in a purely passive sense, in that they are not intended to change shape in response to temperature change in use of the respective structure and no means are provided for deliberately applying an electrical voltage to the wires or otherwise initiating their thermal transformation, in contrast to known active structures which employ heated SMA elements to impart motion or apply a force. Neither will they normally be prestrained within the woven preform. However it is within the scope of the invention for either of those measures to be employed; for example it might be possible to temporarily repair a damaged structure or avoid catastrophic failure by reversing its deformation by heating. Other functionality may also be exhibited in the passive role; for example the SMA wires may impart enhanced damping or other energy absorbing properties to the structure or provide lightning strike protection or other electrical bonding.

The invention also resides per se in a fabric comprising SMA wires woven together with fibres of a different composition, the SMA wires being of a composition and in a proportion to substantially enhance the impact resistance of the fabric at a predetermined operating temperature or range thereof, whether for use as a preform in an FRP reinforced composite structure or otherwise. For example such a fabric may also find utility in the manufacture of body armour or other impact-resistant clothing.

DESCRIPTION OF THE FIGURES

The invention will now be more particularly described, by way of example, with reference to the accompanying schematic drawings in which:—

DESCRIPTION OF A PREFERRED EMBODIMENT

Figure 1:
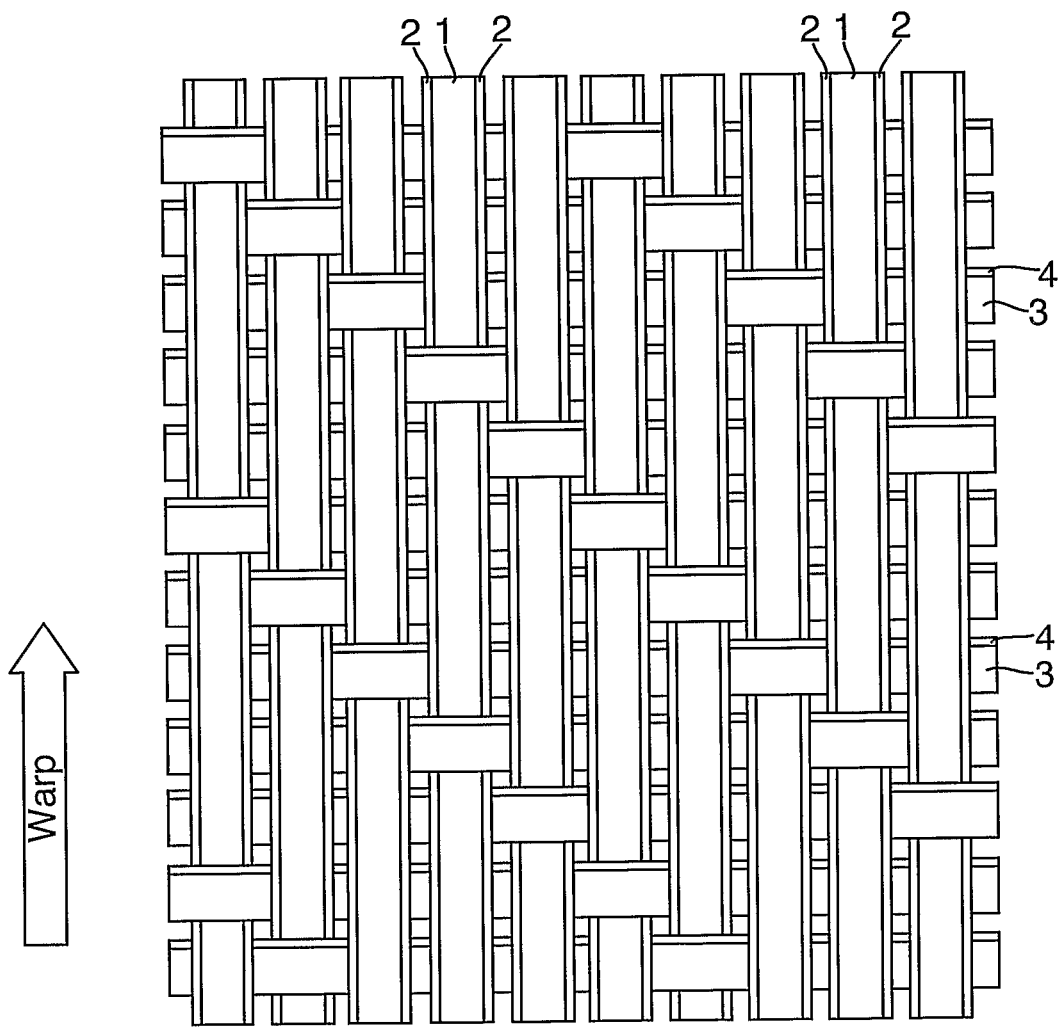
FIG. 1 illustrates in plan a first embodiment of a woven SMA/fibrous preform for incorporation in an FRP composite structure according to the invention.

Referring to FIG. 1 there is shown a woven SMA/fibrous preform which has been cut from a continuous length of fabric of which the warp direction is indicated by the arrow. The warp comprises a series of combination threads each comprising a flat tow 1 of carbon fibres and a pair of SMA wires 2, one at each lateral edge of the tow 1. The weft comprises a series of combination threads each comprising a flat tow 3 of carbon fibres and a single SMA wire 4 at one lateral edge of the tow 3.

Figure 2:
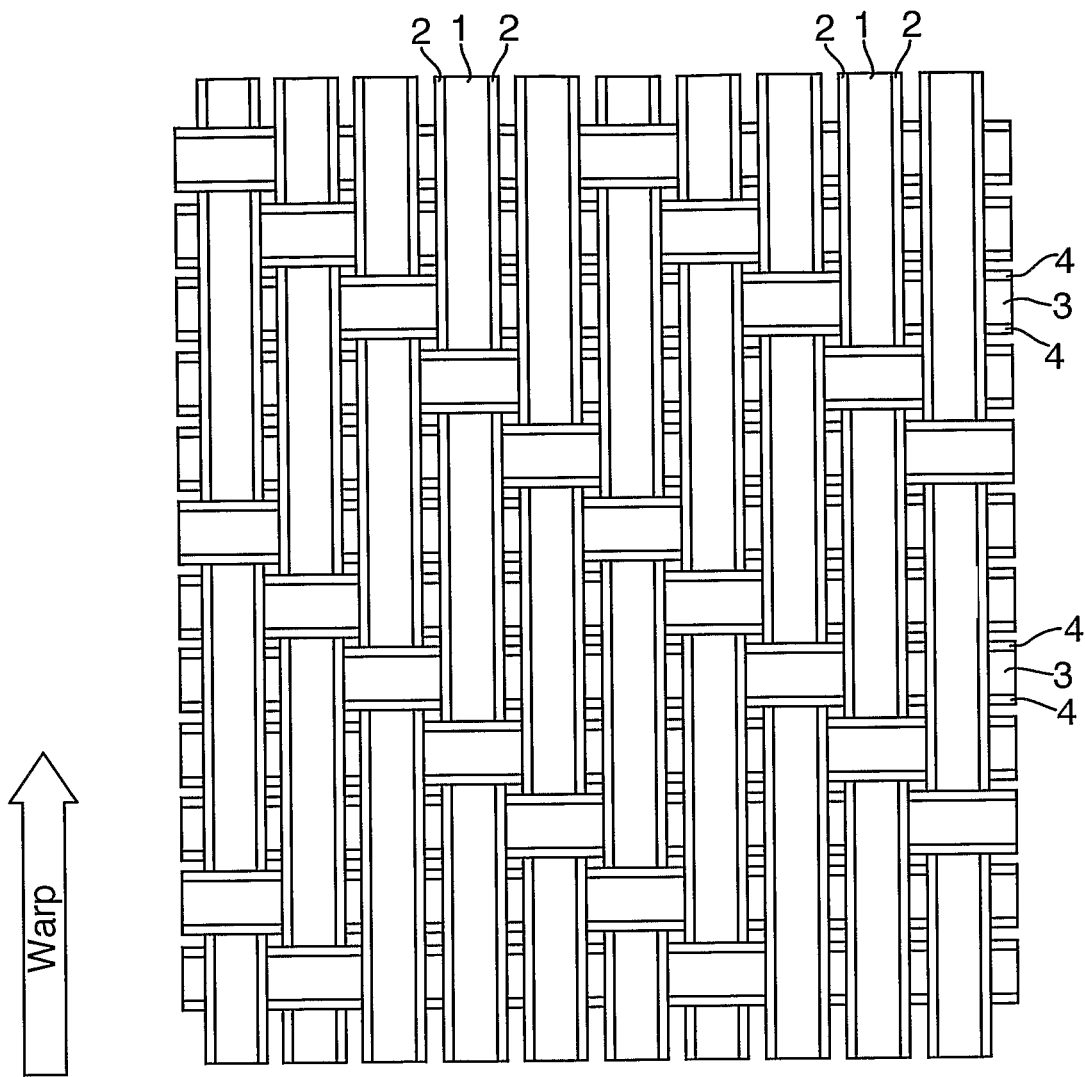
FIG. 2 illustrates in plan a second embodiment of a woven SMA/fibrous preform for incorporation in an FRP composite structure according to the invention.

The preform shown in FIG. 2 is similar to the FIG. 1 embodiment except that in this case there are two SMA wires per carbon tow in both the warp and the weft. If greater numbers of SMA wires 2 or 4 per carbon tow 1 or 3 are desired in either direction, the additional wires may be incorporated at regular intervals across the widths of the respective tows.

In each of the illustrated embodiments the type of weave shown is known as "five harness satin", where each weft tow overlies every fifth warp tow, the loops of consecutive tows being displaced by one across the fabric to give the illustrated diagonal pattern, but in principle any conventional weave pattern may be employed.

The following table indicates the make up of a series of illustrative FRP composite laminates which have been fabricated in accordance with the invention:—

| Laminate Number | No. of Carbon Plies | No. of Carbon/SMA Plies | Carbon/SMA Weave | SMA Vol. Fraction % |
|---|---|---|---|---|
| 1 | 3 | 1 | 2wp0wf | 3.1 |
| 2 | 3 | 1 | 2wp1wf | 4.5 |
| 3 | 3 | 1 | 2wp2wf | 5.7 |
| 4 | 3 | 1 | 2wp3wf | 7.1 |
| 5 | 2 | 2 | 2wp0wf | 5.8 |
| 6 | 2 | 2 | 2wp1wf | 8.1 |
| 7 | 2 | 2 | 2wp2wf | 10.0 |
| 8 | 2 | 2 | 2wp3wf | 11.8 |

Each of these laminates comprised an epoxy resin matrix containing the indicated number of plies of a woven carbon fibre preform and the indicated number and type of woven carbon fibre/SMA wire preforms. Each carbon tow in each preform comprised a flat bundle of approximately 6,000 individual fibres of 7.1 μm diameter and each SMA wire was nitinol of approximately 250 μm diameter. The carbon/SMA weave designation indicates the number of SMA wires per carbon tow in the warp and weft directions of the respective integrated preform, so that for example 2wp1wf means two SMA wires per tow in the warp direction and one SMA wire per tow in the weft direction (corresponding to the embodiment of FIG. 1), 2wp2wf means two SMA wires per tow in the warp direction and two SMA wires in the weft direction (corresponding to the embodiment of FIG. 2) and so on. The final column in the table indicates the resultant volume fraction of SMA in each overall laminate.

To illustrate the efficacy of the invention in enhancing the impact resistance of FRP composites the following experiment was conducted.

A sample laminate was made up comprising four plies of conventional woven carbon fibre preform in a matrix of Hexcel® 8552 epoxy resin. Sample laminates were also made up in accordance with each of the compositions 1-8 indicated in the table above, all therefore also having a total of four plies, three or two of which were of the same all-carbon fibre preform and one or two of which were of a woven carbon fibre/SMA wire preform of the designated weave, in the same matrix resin. In this case the alloy type was one which exhibited predominantly a stress-induced martensitic twinning response at ambient temperature.

Each sample, held in a 100 mm diameter Crag ring, was subjected to a full penetration impact energy absorption test in a Rosand® falling weight impactor, using a 16 mm hemispherical tup at a velocity of about 4 m/s delivering 50 J impact energy. Normalised for the different thicknesses of the samples, all of the samples 1-8 according to the invention absorbed over 40% more impact energy than the all-carbon sample, and some more than twice. Visual inspection also showed the samples according to the invention to have spread the energy absorption over a substantially greater area of the laminate than the all-carbon sample. By way of example the all-carbon sample was 1.33 mm thick and absorbed 9.4 Joules (7.1 J/mm); laminate 2 incorporating one carbon/SMA ply corresponding to FIG. 1 was 1.59 mm thick and absorbed 16.8 Joules (10.6 J/mm); and laminate 7 incorporating two carbon/SMA plies corresponding to FIG. 2 was 1.94 mm thick and absorbed 26.1 Joules (13.5 J/mm).

Figure 3:
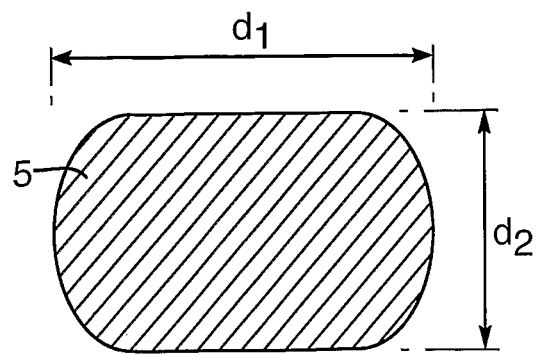
FIG. 3 is a transverse cross-section through a preferred form of SMA wire for use in a structure according to the invention.

Although in the samples described above the SMA wires are of circular cross-section, there may be advantage in employing flatter, tape-like wires instead, for the reasons previously elucidated. By way of example, FIG. 3 illustrates the cross-section of a wire 5 which may be used for this purpose, being rolled from a stock circular wire of 250 µm diameter into the illustrated oval cross-section with a major cross-sectional dimension $d_1$ of approximately 310 µm and a minor cross-sectional dimension $d_2$ of approximately 190 µm, and which would be woven into the respective preform with $d_1$ aligned with the plane of the preform. In other embodiments tape-like SMA wires may be drawn into the desired form at the time of manufacture and with a higher ratio of $d_1:d_2$.

The invention claimed is:

1. A load bearing composite structure comprising at least one ply of a polymer matrix with reinforcing fibres and shape memory alloy (SMA) wires embedded therein, the SMA wires being of a composition and in a proportion to substantially enhance the impact resistance of the structure at a predetermined operating temperature or range thereof, wherein said alloy is of a type which exhibits predominantly a stress-induced martensitic twinning response at said operating temperature or range, the composite structure comprising one or more integral woven preforms, wherein the one or more integral woven preforms comprise reinforcing tows extending in the warp direction and reinforcing tows extending in the weft direction, wherein each of the reinforcing tows extending in the warp direction include at least one SMA wire at a lateral edge of the tow and each of the reinforcing tows extending in the weft direction include at least one SMA wire at a lateral edge of the tow.

2. A structure according to claim 1 wherein said SMA is selected from the group comprising Ti—Ni, Ti—Ni—Cu, Ti—Ni—Nb, Ti—Ni—Hf, Cu—Zn—Al, Cu—Al—Ni, Cu—Al—Zn—Mn, Cu—Al—Ni—Mn, Cu—Al—Mn—Ni, Fe—Mn—Si, Fe—Cr—Ni—Mn—Si—Co, Fe—Ni—Mn, Fe—Ni—C and Fe—Ni—Co—Ti alloys.

3. A structure according to claim 1 wherein the volume fraction of said SMA wires in the structure is in the range 2-25%.

4. A structure according to claim 3 wherein the volume fraction of said SMA wires in the structure is in the range 3-12%.

5. A structure according to claim 1 wherein said SMA wires have a cross-section which is substantially longer in a first dimension than in a second dimension perpendicular to the first, and are woven into the respective preform with the longer dimension generally parallel to the plane of the preform.

6. A structure according to claim 1, being an essentially passive structure.

7. A structure according to claim 1 wherein said reinforcing fibres are selected from the group comprising carbon, glass, aramid, polyethylene and boron fibres.

8. A structure according to claim 1 wherein said reinforcing fibres have a tensile modulus in excess of 50 GPa.

9. A structure according to claim 8 wherein said reinforcing fibres have a tensile modulus in excess of 200 GPa.

10. A fabric comprising shape memory alloy (SMA) wires woven together with fibres of a different composition, the SMA wires being of a composition and in a proportion to substantially enhance the impact resistance of the fabric at a predetermined operating temperature or range thereof wherein said alloy is of a type which exhibits predominantly a stress-induced martensitic twinning response at said operating temperature or range the fabric comprising reinforcing tows extending in the warp direction and reinforcing tows extending in the weft direction, wherein each of the reinforcing tows extending in the warp direction include at least one SMA wire at a lateral edge of the tow and each of the reinforcing tows extending in the weft direction include at least one SMA wire at a lateral edge of the tow.

11. A fabric according to claim 10 wherein said SMA is selected from the group comprising Ti—Ni, Ti—Ni—Cu, Ti—Ni—Nb, Ti—Ni—Hf, Cu—Zn—Al, Cu—Al—Ni, Cu—Al—Zn—Mn, Cu—Al—Ni—Mn, Cu—Al—Mn—Ni, Fe—Mn—Si, Fe—Cr—Ni—Mn—Si—Co, Fe—Ni—Mn, Fe—Ni—C and Fe—Ni—Co—Ti alloys.

12. A fabric according to claim 10 wherein said SMA wires have a cross-section which is substantially longer in a first dimension than in a second dimension perpendicular to the first, and are woven into the fabric with the longer dimension generally parallel to the plane of the fabric.

13. A fabric according to claim 10 being an essentially passive fabric.

14. A fabric according to claim 10 wherein said fibres are selected from the group comprising carbon, glass, aramid, polyethylene and boron fibres.

15. A fabric according to claim 10 wherein said fibres have a tensile modulus in excess of 50 GPa.

16. A fabric according to claim 15 wherein said fibres have a tensile modulus in excess of 200 GPa.

17. A structure according to claim 1 for use in the aerospace field.

18. A load-bearing composite aerospace structure comprising at least two plies of woven carbon fibre preforms in a polymer matrix and at least two plies of flat carbon reinforcing fibres and shape memory alloy (SMA) wires embedded in a polymer matrix, the SMA wires being of a composition and in a proportion to substantially enhance the impact resistance of the structure at a predetermined operating temperature or range thereof, the load bearing composite aerospace structure comprising one or more integral woven preforms, wherein the one or more integral woven preforms comprise reinforcing fibres extending in the warp direction and reinforcing fibres extending in the weft direction, wherein at least some of the reinforcing fibres extending in the warp direction are incorporated together with SMA wires and at least some of the reinforcing fibres extending in the weft direction are incorporated together with SMA wires wherein the SMA wires are at a lateral edge of the flat carbon reinforcing fibre.

19. An item of impact-resistant clothing comprising the fabric of claim 10.

20. A structure according to claim 18 wherein the at least two plys of the polymer matrix with reinforcing fibres and shape memory alloy (SMA) wires embedded therein include at least two SMA wires per carbon tow in the warp direction and at least two SMA wires per carbon tow in the weft direction.

21. A structure according to claim 1 wherein at least some of the reinforcing tows extending in the warp direction include a pair of SMA wires, one at each lateral edge of the tow.

22. A structure according to claim 1 wherein at least some of the reinforcing tows extending in the weft direction include a pair of SMA wires, one at each lateral edge of the tow.

23. A structure according to claim 1 wherein at least some of the reinforcing tows extending in the weft direction and at least some of the reinforcing tows extending in the warp direction each include a pair of SMA wires, one at each lateral edge of the tow.

24. A structure according to claim 1 including at least one ply of woven fibre preform in a polymer matrix and the at least one ply of a polymer matrix with reinforcing fibres and shape memory alloy (SMA) wires embedded therein.

* * * * *